July 12, 1966  R. A. LOGAN  3,260,115
TEMPERATURE SENSITIVE ELEMENT
Filed May 18, 1962  2 Sheets-Sheet 2
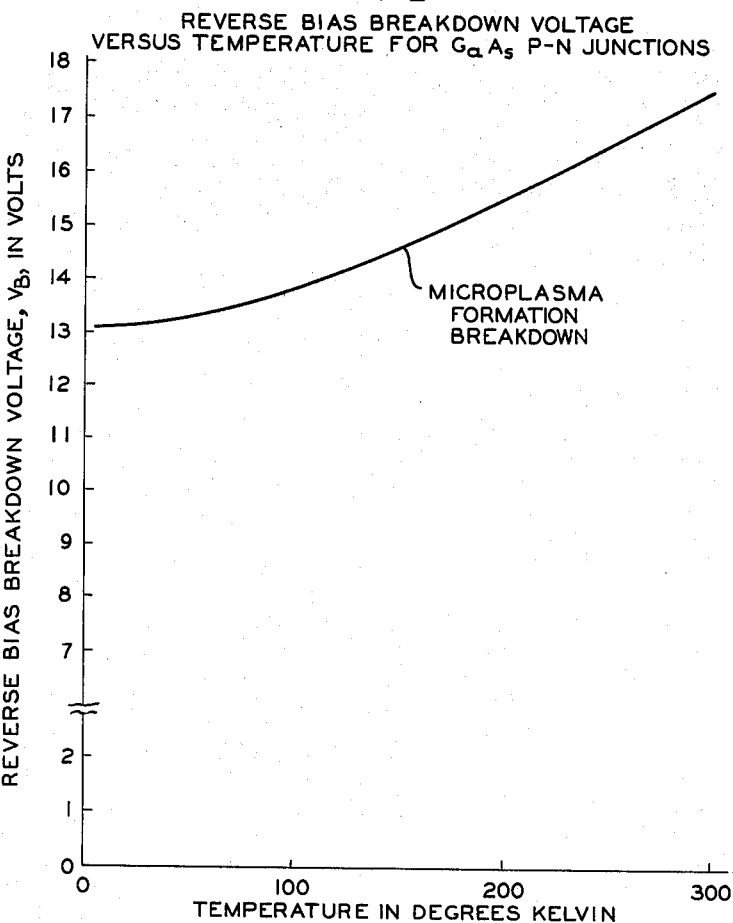
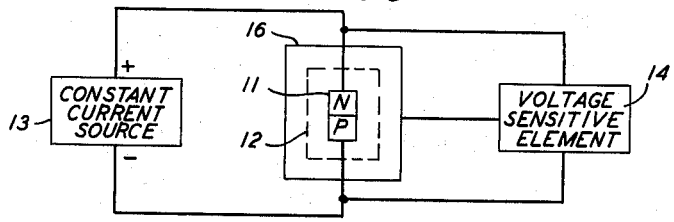
INVENTOR
R. A. LOGAN
BY
ATTORNEY

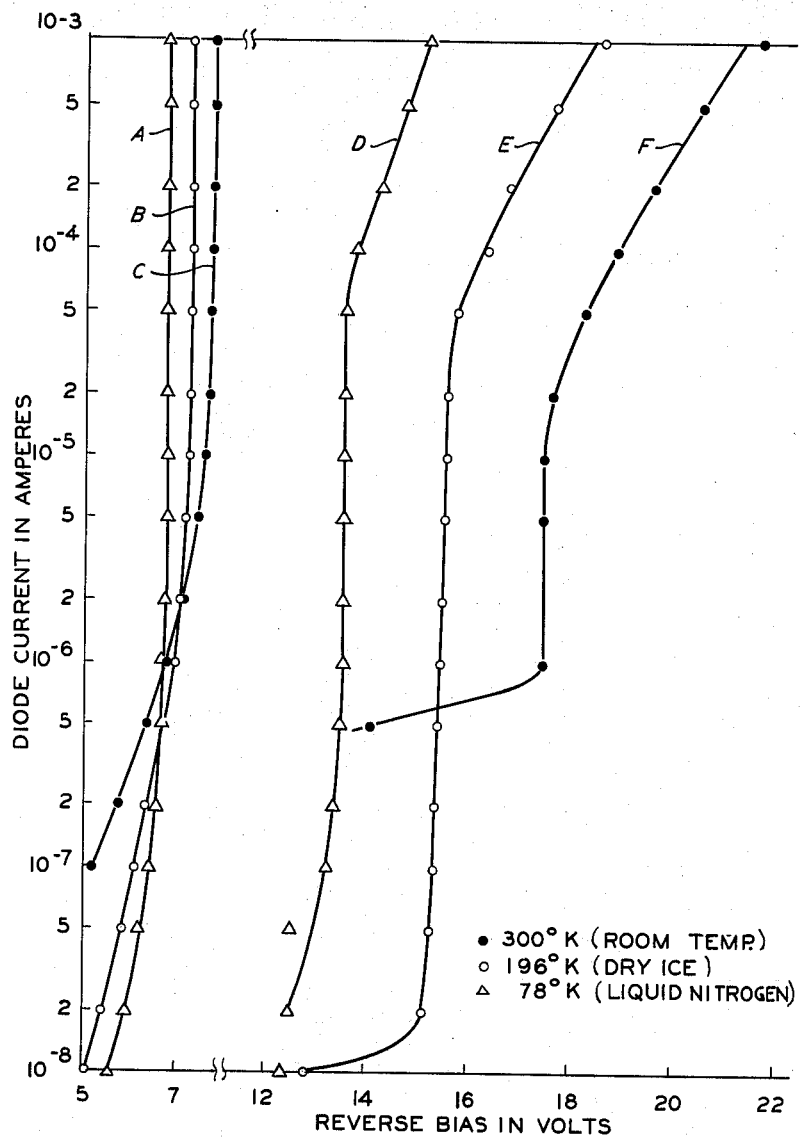

United States Patent Office 3,260,115
Patented July 12, 1966

3,260,115
TEMPERATURE SENSITIVE ELEMENT
Ralph A. Logan, Morristown, N.J., assignor to Bell Telephone Laboratories, Incorporated, New York, N.Y., a corporation of New York
Filed May 18, 1962, Ser. No. 195,915
8 Claims. (Cl. 73—362)

This invention relates to temperature sensitive devices utilizing a semiconductive element as the temperature sensitive element.

Present day technology, with its emphasis on extreme precision of measurement of numerous variable or varying parameters, has necessitated the creation of measuring devices of sensitivities that are, in many instances, orders of magnitude greater than existing instruments. For example, in the field of environmental control which, with the advent of such fields as space exploration, has become almost a branch of science in itself, the creation of certain unusual environmental conditions and the precise maintenance of these conditions over extended periods of time necessitates numerous measuring and monitoring devices of unusual precision and accuracy. One of the most important of the conditions to be maintained is, in many cases, temperature.

Many of the present day devices under investigation and in use, e.g., masers and optical masers, require extremely low temperatures for proper operation, and the maintenance of these low temperatures, especially in cases where the device is in a remote or inaccessible location, requires some sort of temperature control system which is capable of responding to undesirable changes in temperature to correct the change and maintain optimum operating conditions.

In the foregoing, and in many other arrangements, it is desirable, and sometimes necessary, to translate the temperature change into a state or form which can be used to exercise a control function, such as electric current or voltage. One of the better known and most sensitive devices for translating temperature changes into signal voltages is the thermocouple, which, in response to a change in temperature, produces a voltage which can be used to exercise a control function over temperature maintenance apparatus or simply activate a voltmeter calibrated in degrees to give a thermometric reading. At the present time, however, the most sensitive of thermocouples is capable of producing only a single millivolt for approximately each twenty-five degrees Kelvin change in temperature. Smaller temperature changes produce considerably less than a millivolt, necessitating the use of sensitive and complex amplifying equipment to produce a useable output control signal. In many instances today, a twenty-five degree Kelvin temperature swing to produce a single millivolt change is far too coarse a metering to be of any practical use, hence complexity of the system is inherent in the use of even the best thermocouples where great sensitivity is required.

It is an object of this invention to produce useable voltage signals in response to extremely small changes in temperature.

It is another object of this invention to eliminate much of the complexity of existing high sensitivity temperature sensitive devices.

These and other objects of the present invention are achieved in an illustrative embodiment thereof which comprises a semiconductor p-n junction diode of gallium arsenide, to which is connected a constant current source in a manner such that the diode is biased in reverse. Connected across the diode is a voltage responsive element which may be a simple voltmeter calibrated in degrees, or, as will be apparent hereinafter, any one of a number of forms of voltage responsive elements, depending upon the particular function of the temperature measuring circuit.

The present invention is based upon my discovery that a gallium arsenide p-n junction diode containing a high dislocation density, the meaning of which will be explained hereinafter, has an exceptionally high sensitivity to temperature changes, producing a useable voltage output for very slight temperature changes.

It is another feature of the invention in an embodiment thereof that the p-n junction diode be connected in circuit with a constant current source in a reverse-biased condition.

These and other features of the present invention will be more readily apparent from the following detailed description taken in conjunction with the accompanying drawings, in which:

FIG. 1 is a graph of the current-voltage characteristics of a typical gallium arsenide p-n junction diode exhibiting avalanche breakdown, and for a gallium arsenide diode having a high dislocation density, for various temperatures;

FIG. 2 is a graph of the reverse breakdown voltage versus temperature for a diode of the kind useful in the present invention; and FIG. 3 is a block diagram of a temperature control arrangement embodying the principles of the present invention.

Turning now to FIG. 1, curves A, B, and C represent the current-voltage characteristics of a typical gallium arsenide diode biased in the reverse direction at liquid nitrogen (78° K.), Dry Ice (196° K.), and room temperatures (300° K.), respectively, and curves D, E, and F represent the current voltage characteristics of a gallium arsenide diode biased in the reverse direction and containing a high dislocation density of the kind intended for use in the invention at the same respective temperatures. By "typical" diode is meant one fabricated by present day techniques and perfected materials, where the dislocation density is of the order of 1,000 per cm.$^2$ or less, whereas "high dislocation density" describes a diode having dislocation of the order of $10^5$ per cm.$^2$ or more. Dislocations are expressed in terms of square centimeters inasmuch as they are measured across a transverse section of the crystal, and are longitudinally or axially continuous. Curves A, B, and C are readily recognizable as depictions of the portion of the voltage-current characteristic beyond the breakdown region of the well known avalanche breakdown phenomenon. Of interest in the context of the present invention is the fact that despite the 222° K. range of temperatures, for a given current the three curves have a maximum separation of approximately one volt between the highest and the lowest temperatures. On the other hand, for the same range of temperatures, curves D and F, representing the lowest and highest temperatures, respectively, for a given current have a maximum separation of approximately four volts. This wide separation is a consequence of the fact that the diode of curves D, E, and F has a high dislocation density.

The term "dislocation" is a generic term utilized to designate a fault or faults in a crystal. The fault may take the form of a lattice irregularity, misarrays of atoms within the material, stacking faults, or any of a number of other types of faults which tend to produce disturbances in the crystal lattice. Such dislocations in a diode, when the diode is reverse-biased, prevent the occurrence of the normal type of avalanche breakdown and, instead, produce a breakdown through the generation of microplasmas of current. These microplasmas of current might be described as minute localized avalanche breakdowns, and I have found that current flow as a result of microplasma generation makes the diode highly temperature sensitive.

Dislocations may be formed in a number of ways. For example, the normal crystal may be heated to a plastic condition and then twisted, bent, stretched, or otherwise deformed. Another method for creating a crystal having the desired dislocations is to grow the crystal from a seed having dislocations in which case the grown crystal will also have the desired dislocations. Dislocations may also be formed by growing the crystal in a furnace and, after growth is completed, removing the crystal from the furnace and cooling rapidly. The differential expansion upon cooling, together with the mechanical shock of rapid removal of the crystal from the furnace, produces the desired dislocations. A dislocation density of at least $10^5$ per cm.$^2$ is desirable in order to achieve the required temperature sensitivity. It is preferred that it be between $10^5$ and $5 \times 10^6$ per cm.$^2$, the latter figure being approximately the upper limit for the microplasma generation phenomenon.

In FIG. 2, there is shown a graph of the reverse breakdown voltage versus temperature for a gallium arsenide diode having a dislocation density of $10^6$ per cm.$^2$. It can readily be seen that in the temperature range of 78° Kelvin to 300° K., the linear temperature coefficient $\partial V_B/\partial T$, where $V_B$ is the reverse breakdown voltage and T is temperature in degrees Kelvin is approximately twenty millivolts per degree Kelvin. On the other hand, as pointed out before, the best thermocouples produce approximately only $\frac{1}{25}$ millivolt per degree Kelvin. It can be seen, therefore, that the temperature sensitivity of the device of the present invention is orders of magnitude greater than that of the best thermocouples in this temperature range.

With regard to FIG. 2, the bias range of the junctions used to make the measurements was from 13 to 17.4 volts, which is much greater than that encountered in forward bias operation. It can be seen that the currents through the junction are too small to cause any material heating of the junction itself, hence the ambient temperature is the controlling factor in a properly fabricated diode. $V_B$ is determined by the doping level of the gallium arsenide crystal and is, in fact, roughly inversely proportional to the net impurity concentration in the crystal if the diffused or otherwise applied layer is relatively heavily doped, i.e., of low resistivity. In other words, $V_B$ is directly proportional to the resistivity of the base crystal if the diffused layer resistivity is sufficiently lower than the bulk crystal. Since $\partial V_B/\partial T_B$ is proportional to $V_B$, by proper choice of the doping level $V_B$ can be selected and, as a consequence, $\partial V_B/\partial T$. Thus, the coefficient can be made as large as desired within the limits of the technology of producing p-n junctions in doped crystals.

Turning now to FIG. 3, there is shown in block diagram form a temperature control arrangement embodying the principles of the present invention. The circuit of FIG. 3 comprises a gallium arsenide p-n junction diode 11 having a suitably high dislocation density, as discussed, mounted inside of chamber 12, the temperature of which is to be maintained constant. Chamber 12 is depicted by dotted lines for the sake of clarity. Diode 11 is reverse biased by a constant current source 13 which may supply a current of 10 microamperes, for example. The only limitation on the current is that it be within the range of voltage breakdown at all temperatures to be encountered, in which case the voltage across the diode is a measure of the temperature. Connected across diode 11 is a voltage sensitive element 14 which may take any one of a number of forms, such as a highly sensitive relay, a switch, or, in cases where extreme sensitivity is required, an amplifier sensitive to exceedingly small voltage changes. Device 14 is, in turn, connected to a temperature control apparatus 16, e.g., a refrigerating unit, which acts to vary the temperature of device 12. In operation, with the diode operating within the linear portion of its temperature sensitivity curve, any change in temperature within the device 12 will produce a voltage across the diode which will activate device 14, which, in turn, either turns unit 16 on or off until the proper temperature in member 12 is again achieved. For a gallium arsenide diode, the sensitivity curves of which are shown in FIGS. 1 and 2, a change of $\frac{1}{20}$ of a degree Kelvin will produce one millivolt across the diode, which is sufficient to activate numerous types of sensitive relays, switches and the like known in the art. If even greater sensitivity is desired, device 14 may include an amplifying circuit with the output of the diode being applied, for example, to the grid of the first stage for amplification.

While the arrangement of FIG. 3 is used for temperature control, it is obvious that the basic arrangement can be used for other purposes. For example, device 14 may be simply a voltmeter calibrated in degrees, in which case the diode functions as an ultrasensitive thermometer. Many other applications and uses of the diode will be readily apparent to workers in the art.

In a specific embodiment of the invention, an n-type gallium arsenide crystal was grown in a furnace in a quartz ampule at a temperature ranging from 1245° C. to 1270° C. by the well known Bridgman technique, and then quickly removed therefrom and rapidly cooled. The dual effect of sudden removal from the furnace and rapid cooling produced a dislocation density of $10^6$ per cm.$^2$ which is a preferred density. The crystal was then sliced into wafers approximately 0.020 inch thick and chemically cleaned with etchants, after which the wafers were sealed in a quartz tube under vacuum. The quartz tube contained sufficient zinc to produce a pressure of 100 mm. Hg at the diffusion temperature. The wafers were then heated at 800° C. for thirty minutes to produce a p-type zinc diffused layer approximately 0.3 mil deep in the n-type crystal, the crystal having a resistivity of 0.02 ohm-cm. The diffused layer was electroplated successively with nickel and gold and electrical contact was achieved by pressing a pointed member to the plated surface. The n-type side of the diode was soldered to a conventional header. The junction was then delineated by conventional waxing and etching techniques and was typically 3 mils in diameter. Temperature sensitivity studies were then made using liquid nitrogen, Dry Ice, and room temperature and the curves of FIGS. 1 and 2 were achieved.

The linear portions of the curves of FIGS. 1 and 2 can be extended by use of more strict controls in the manufacture of the diodes, as well as exercise care to insure cleanliness and freedom from contamination.

The principles of the invention have been set forth in terms of a gallium arsenide p-n junction diode, since gallium arsenide combines the best features of both silicon and germanium. Like silicon, it has a high energy gap, hence it is less likely to have changes in characteristics or properties in circuit applications. Like germanium, it has a high charge carrier mobility; as a matter of fact, its mobility exceeds that of germanium. However, it will be apparent to workers in the art that other types of p-n diodes having suitable dislocation densities may also function as temperature sensitive devices in control circuits or the like. Furthermore, while the principles of the invention have been explained in connection with certain illustrative embodiments, other various embodiments will be apparent to workers in the art without departure from the spirit and scope of the invention.

What is claimed is:

1. A temperature measuring system comprising a gallium arsenide p-n junction diode having a high dislocation density between $10^5$ and $5 \times 10^6$ per cm.$^2$, a source of current connected to said diode in a reversed bias sense, the current supplied by said source being within the voltage breakdown range of said diode and a voltage responsive element connected in parallel with said diode.

2. A temperature measuring system as claimed in claim 1 wherein said voltage responsive element comprises a voltmeter calibrated in degrees.

3. A temperature measuring system as claimed in claim 1 wherein said voltage responsive element comprises a switching device.

4. A temperature control system for maintaining a constant temperature comprising a temperature control apparatus, and means for controlling the action of said temperature control apparatus comprising means responsive to changes in the temperature to be controlled for producing a signal voltage proportional to the temperature change, said last mentioned means comprising a p-n junction diode having a high dislocation density, a source of constant current connected to said diode in a reversed bias sense, and voltage sensitive means connected in parallel with said diode, said voltage sensitive means being connected to said temperature control apparatus and responsive to changes in the voltage across said diode to control the action of said temperature control apparatus.

5. A temperature control system as claimed in claim 4 wherein the current supplied by said constant current source is within the range of voltage breakdown of said diode at the temperature encountered.

6. A temperature control system as claimed in claim 4 wherein said p-n junction diode has a dislocation density in the range of $10^5$ per cm.$^2$ to $5 \times 10^6$ per cm.$^2$.

7. A temperature control system as claimed in claim 4 wherein said p-n junction diode is of gallium arsenide having a dislocation density of $10^6$ per cm.$^2$.

8. A temperature control system as claimed in claim 4 wherein said p-n junction diode is of gallium arsenide and has a dislocation density range of $10^5$ to $5 \times 10^6$ per cm.$^2$ and a temperature voltage coefficient of approximately 20 millivolts per degree Kelvin.

References Cited by the Examiner

UNITED STATES PATENTS

| | | | |
|---|---|---|---|
| 2,753,714 | 7/1956 | Perkins | 73—362 |
| 2,830,239 | 4/1958 | Jenny | 317—237 |
| 2,834,008 | 5/1958 | Carbauh | 340—227 |
| 2,871,330 | 1/1959 | Collins | 252—501 |
| 2,996,918 | 8/1961 | Hunter | 73—362 |
| 3,012,175 | 12/1961 | Jones | 317—237 |
| 3,054,033 | 9/1962 | Iwama et al. | 317—234 |
| 3,064,167 | 11/1962 | Hoerni | 317—234 |
| 3,068,338 | 12/1962 | Bigler | 307—88.5 |
| 3,076,339 | 2/1963 | Barton | 73—362 |
| 3,092,998 | 6/1963 | Barton | 73—362 |
| 3,109,938 | 11/1963 | Wolski | 317—234 |

FOREIGN PATENTS 640,901    5/1962    Canada.

ISAAC LISANN, *Primary Examiner.*